Figure 1:
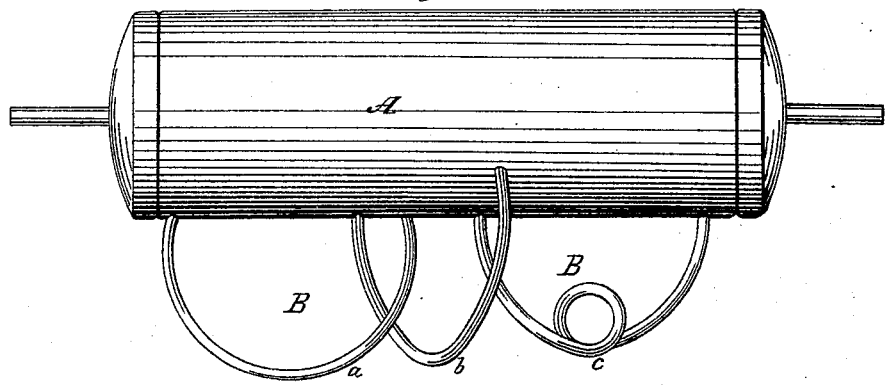

M. S. BRINGIER.
Evaporating Pan.

No. 70,690.

2 Sheets—Sheet 1.

Patented Nov. 12, 1867.

Witnesses:
Emile Rost
Rufus R. Rhodes

Inventor:
M. S. Bringier

M. S. BRINGIER.
Evaporating Pan.
No. 70,690.
2 Sheets—Sheet 2.
Patented Nov. 12, 1867.
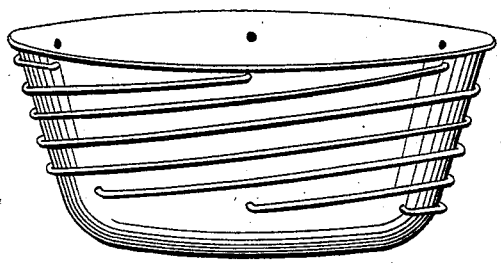
Witnesses:
Inventor:

United States Patent Office.

M. S. BRINGIER, OF ASCENSION PARISH, LOUISIANA.

*Letters Patent No. 70,690, dated November 12, 1867.*

IMPROVEMENT IN EVAPORATION AND VAPORIZATION.

*The Schedule referred to in these Letters Patent and making part of the same.*

TO ALL WHOM IT MAY CONCERN:

Be it known that I, M. S. BRINGIER, of the parish of Ascension, in the State of Louisiana, have invented certain new and useful Improvements in the Construction of Boilers, whether the same be designed for the generation of steam as a motor for engines, the more rapid evaporization of cane-juice in the manufacture of sugar, or any other useful or economic purpose in the arts; and I do hereby declare the following to be a full, clear, and exact description of the same, reference being had to the annexed drawings, making a part of this specification.

To state them in general and comprehensive terms, my invention has for its objects to increase the extent of the fire-surface, and the evaporation of the liquid acted upon, without reducing the capacity of the boiler, kettle, retort, or other vessel in which the liquid is contained, or as to which such extent of fire-surface and increased evaporation relates; to utilize the superior latent heat of the steam, and at the same time to diminish the consumption of fuel.

In other words, my invention is an improvement upon my invention as patented in 1859, and it consists in the application, in the first place, of a system of tubes, externally applied to any boiler, kettle, retort, or other vessel in which is to be effected a generation of steam, an evaporation of extraneous or useless ingredients, or any other useful or economic object, which system of tubes is so arranged or applied as to be exempt from all danger of obstruction from the accumulation of sand, mud, salt, or any other solid substance, in any one or more of the tubes composing it, and through which, therefore, there will always be a free and rapid circulation of the fluid, as well as of the gases or vapors evolved therefrom, no matter what may be the nature of the fluid contained in the vessel to which the tubes are applied, nor the object sought to be obtained by the heating or evaporation of the same.

In the second place, my invention consists of a means of utilizing the excess of latent heat that always exists in steam that is confined over the water from which it has been generated, and the making of the same subservient to the production of more steam, and consequently to a further reduction of fuel.

But my invention will be more quickly and clearly understood by referring to the drawings, in which, on plate 1, A represents what we may suppose to be an ordinary horizontal steam-boiler without internal flue; B, a system of tubes outside the boiler below the water-line; and C a coil of wire gauze, enveloping a revolving axis that passes longitudinally through the same.

Figure 2:
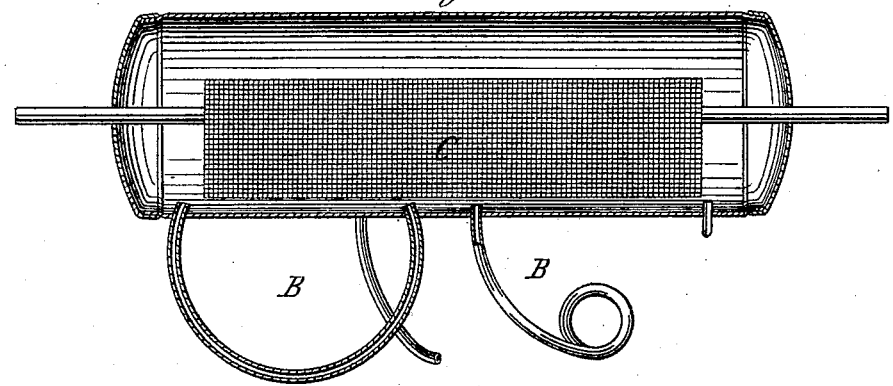

Figure, plate 1, is a perspective view of the outside of said boiler,

Figure 2 a sectional view in the line of the length of the same, and

Figure 3:
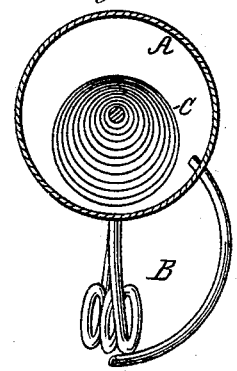

Figure 3 a cross-section.

On plate 2 the figure represents an ordinary sugar-kettle or boiler for evaporating or reducing cane-juice that is provided with my external tubing. At all the figures the tubes that are delineated are shown merely for the purpose of illustration, for I wish it to be distinctly understood I do not confine myself to any form therein exhibited. In the practice of my invention, the tubes may be multiplied until all the space contained in the circumference of a boiler that is below the water line is entirely exhausted; and still another system or series of tubes may be added thereto by an insertion of their ends into those that have a direct connection with the boiler, and so on indefinitely, until the fire-surface be extended as far as by possibility can be useful, and the evaporation be increased to the greatest practicable limit.

The tubes are inserted into the boiler or other vessel to which they are applied below the water line, as stated, and in such manner that all their ends, excepting those that enter upon the sides of the boiler, and are hence horizontal in their position, shall project two or three inches beyond the inner surface of the shell of the boiler. The best size for the tubes I have not yet determined, but it is certain they should be very small in order to accomplish the most complete results. Their form may be varied indefinitely. They may, for example, present the curved form, as shown at $a$, or the section of an ellipse, as at $b$. They may be serpentine; they may contain a greater or less number of convolutions, as shown at $c$; or they may be brought very nearly into contact with the shell of the boiler or other vessel, as seen on plate 2, in connection with the sugar-kettle there delineated, care being taken that there shall never be a positive contact with the shell of the boiler, except only at the points at which the tubes enter the boiler, nor as between any two of the tubes, however thickly they may cluster upon the surface of the boiler and upon each other; or they may, in fine, be of any suitable and proper form, and be applied in any manner, and occupy any relation as to distance, etc., from the shell of the boiler that may be dictated by experience or utility.

I am fully aware that small tubes to serve as flues or conduits for the flame and heat of the furnace, and also to increase the fire-surface and quicken the generation of steam, as applied to the inside of boilers, are in familiar and common use; but my invention is a totally and fundamentally different thing. In the one case the containing capacity of a boiler of any given dimensions is reduced in precise proportion to the multiplication of the tubes; whereas in the other, to wit, my own case, the converse of the proposition obtains, and that capacity is increased in the same ratio with the multiplication of the tubes. Again, in my plan the tubes contain the water or other liquid that is to be acted upon, whilst the flame envelopes them externally, and hence it follows that there is a gain of fire-surface over what can be obtained when the application of heat is made to the inside of the tubes that is exactly equal to the difference of area between the inside and outside of the tubes, and this in itself is a large and important gain, even if we concede that the effect of flame upon the inside of a tube that is surrounded by water be equal to that which is produced when the flame is unconfined, and impinges upon the outside of a tube containing water, which, it is well known, is the reverse of the truth, for nothing is better known than that, when reduced in size to a certain limit, flame cannot be forced through tubes at all, whereas, on the contrary, when the tube contains water or other liquid, the smaller the diameter the more immediate and pronounced is the effect of the external application of heat.

Another advantage arising out of my invention is the absolute certainty with which an equilibrium of pressure and heat is established throughout the whole boiler, an effect difficult, if not impossible, to be attained in boilers provided with internal flues.

When my invention is applied to the generation of steam, no matter what the form of the boiler, nor the form of the tubes, the latter should enter the boiler at some distance below the water line at both their ends. The internal projection of the ends of which I have spoken will effectually prevent the deposition and accumulation within the tubes of foreign substances, except in such minute and detached form as that they will be instantly expelled by the powerful current which the rapid evolution of steam will put in motion.

In the construction of evaporating-boilers for cane-juice or other saccharine liquid, it will be best, in my judgment, to apply the tubes as shown by the drawing on plate 2, that is to say, in such manner that none of them will enter at the bottom of the boiler. But, although I deem this the best mode of application, insomuch as the sirup is transferred to finishing-pans before the evaporation is complete, or the sugar begins to be formed, I do not know that any evil result would follow from the insertion of the tubes under the bottom of the boiler. If in such case any sugar should be precipitated into a tube, it could be removed easily by the introduction of a stop-cock.

I cannot illustrate the enormous economy of my invention better than by a brief statement of the results accomplished by it in my own sugar-mill. In this mill are four boilers, sixty feet long, and thirty-six inches in diameter, and of the most approved construction. I inserted under these boilers eighty short tubes, such as are commonly found in locomotive boilers, and the consumption of fuel was reduced from thirty cords of wood down to ten cords for a period of twenty-four hours; and I have no doubt that if I were to double the number of tubes, five cords or less per diem would be amply sufficient to run the mill. Nor was the saving in fuel the only consequence that followed the application of my invention to the boilers of my mill. The generation of steam was quickened and made more regular. The cause of this immense saving may be easily explained. The water is divided into thin columns, and hence it is more quickly and powerfully acted upon by a very small fire than it could be if not so divided by the tubes, and, owing to the manner in which the division is effected, the fire acts in the most effective possible way.

For the same reason in my invention, whether applied to vessels employed in the evaporation of cane-juice, or to the boiler of a cooking-stove, or any other vessel in which water or other liquid is subjected to the action of flame or heat, the effect is the same. My invention can be applied to any vessel, whatever may be its uses, with the same facility as to a steam-boiler or sugar-kettle, and inasmuch as there is scarcely any limitation as to the number of tubes that can be applied by putting one series upon another in expanding clusters, the extent of the economic advantages that will result from its general adoption and use is manifestly beyond estimation.

As was briefly indicated in the preamble of this specification, a revolving coil of wire gauze forms another element of my invention. This coil is supported upon an axis or shaft that passes longitudinally through the boiler, as is clearly shown at figs. 2 and 3 on plate 1 of the drawings, and it presents an effective mechanical means of utilizing the latent heat of the steam, which, it will be remembered, is always far greater than the latent heat of the water that has produced it, when both are confined in the same vessel, by joining it, so to speak, with the heat from the furnace in the operation of producing more steam. An inspection of the coil as delineated on the drawings will show that it contains innumerable minute cells or interstices, into which the water will enter and be diffused throughout the whole of that portion of the coil that is submerged, and which should be about one-half of the coil. The capillary action would probably bring the water in the coil when the latter is at rest a little above the level of the water in the boiler. If, now, we suppose steam to be raised, and the coil to be constantly revolving, (I have not deemed it necessary to explain the means for doing this,) it is clear that the water that is diffused throughout the coil will be continually brought up within the influence of the steam in a finely-divided or diffused state, and that the effect of the higher latent heat thereof will be at once to convert the water into steam. I have not yet determined the best size or diameter to give this coil of wire gauze, nor what will be the most effective speed at which to revolve it; but these are questions of detail that affect the degree, and not the effect itself. In boilers of such form as to preclude the use of wire gauze in coil or cylindrical form, a vibrating frame may be substituted in lieu thereof, to which thick folds of wire gauze are attached, which, being lifted up and lowered from the water into the steam, and *vice versa*, by the vibration of the frame, will produce the same effect.

Having thus described my invention, what I claim, and desire to secure by Letters Patent, is—

1. The application of one or more series of tubes of small diameter to the external surface of boilers, kettles, or other vessels, as herein described for the purpose set forth.

2. The use of a revolving coil of wire gauze, or the equivalent thereof, inside steam-boilers, as herein described for the purpose set forth.

3. The combination of one or more series of small tubes externally applied to boilers, with an internal revolving coil or cylinder of wire gauze, or its equivalent, as herein described for the purpose set forth.

M. S. BRINGIER.

Witnesses:
  EMILE ROST,
  RUFUS R. RHODES.